(12) United States Patent
Wagner

(10) Patent No.: US 6,312,852 B1
(45) Date of Patent: Nov. 6, 2001

(54) BATTERY CELL COVER WITH FLEXIBLE POSITIVE POST TERMINAL

(75) Inventor: Franz M. Wagner, Zionsville, IN (US)

(73) Assignee: C&D Charter Holdings Inc., Wilmington, DE (US)

( * ) Notice: Subject to any disclaimer, the term of this patent is extended or adjusted under 35 U.S.C. 154(b) by 0 days.

(21) Appl. No.: 09/257,487

(22) Filed: Feb. 25, 1999

Related U.S. Application Data
(60) Provisional application No. 60/076,158, filed on Feb. 26, 1998.

(51) Int. Cl.[7] ............................. H01M 2/06; H01M 2/30
(52) U.S. Cl. .................... 429/179; 429/163; 429/175; 429/178; 429/180; 429/181; 429/183; 429/167; 429/170; 429/171; 429/174; 429/184; 429/185; 429/204; 429/225; 429/226
(58) Field of Search .......................... 429/66, 163, 167, 429/170, 171, 174, 175, 178, 179, 180, 181, 183, 184, 185, 204, 225, 226

(56) References Cited

FOREIGN PATENT DOCUMENTS

2026761A * 2/1980 (GB) .............................. H01M/2/06

* cited by examiner

Primary Examiner—Gabrielle Brouillette
Assistant Examiner—Angela J. Martin
(74) Attorney, Agent, or Firm—Hoffmann & Baron, LLP

(57) ABSTRACT

An expandable, flexible connection between a battery cell case cover and a terminal is provided which compensates for expansions of plates or grids of one polarity connected to that terminal. The expandable design encompasses a flexible battery case which facilitates movement of the battery terminal without compromising the seal between the case and the terminal. Preferably, a tubular thermoplastic sleeve is formed integrally with the case cover and extends into an opening between the cover and a terminal bushing which supports battery plates of one polarity. An annular flexible thermoplastic connector connects the sleeve to the case or to the bushing, with the connector being thinner than the case cover to afford more flexibility than the case cover.

16 Claims, 3 Drawing Sheets

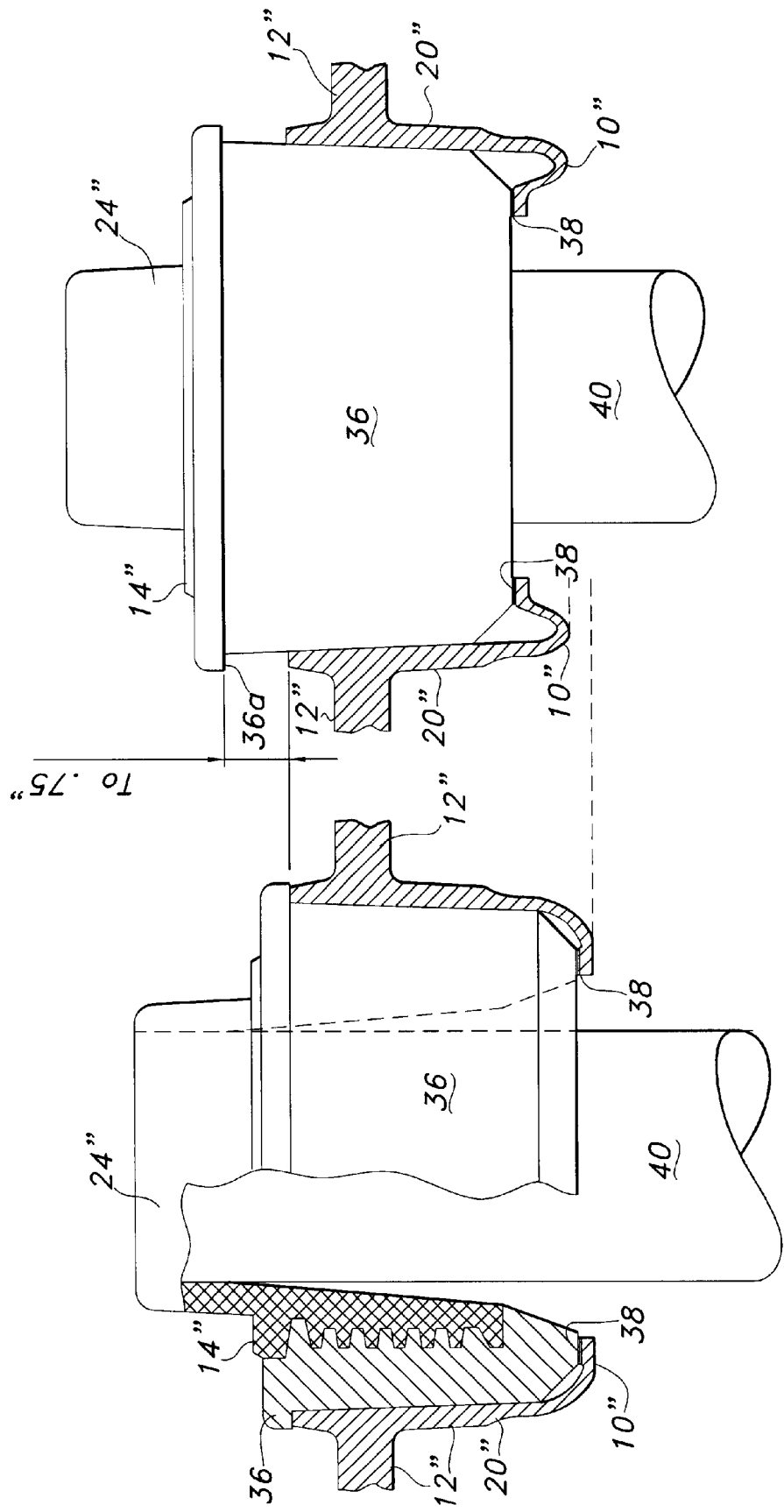

BATTERY CELL COVER WITH FLEXIBLE POSITIVE POST TERMINAL

CROSS-REFERENCE TO RELATED APPLICATIONS

Priority is claimed herein to U.S. Provisional Application No. 60/076,158, filed Feb. 26, 1998, which is incorporated by reference herein.

FIELD OF THE INVENTION

An electrical terminal and battery cell cover for sealed lead acid battery cases is provided. The battery terminal outwardly adjusts relative to the internal electrochemical contents of a sealed lead acid battery by way of a flexible loop cover portion in response to pressures caused by expanding cell grid growth. The terminal and cell cover expansion is accomplished without compromising the seal formed between the terminal and the battery case.

BACKGROUND OF THE INVENTION

This patent application relates to lead-acid batteries, particularly to the structural integrity of lead-acid batteries subject to varying operating conditions and electrical loads.

The internal plates of lead-acid batteries which are usually grids, expand with time, temperature, and load conditions. Grid expansion is more significant with the positive plate, which results from corrosion which adheres to the cell grids as a result of the electrochemical reaction of the battery contents. Grid expansion is particularly problematic in sealed lead-acid batteries due to the hazardous chemical materials housed within the battery case. Often times, as internal grids expand the corresponding pressure of the expansion causes the battery case to fracture or crack. This problem is particularly pronounced in the area of the case cover surrounding the positive battery terminal, due to greater expansion of the positive grid.

Presently, several battery terminals and case arrangements are known utilizing a variety of sealing configurations designed to permit movement of the positive terminal relative to the case at the positive grid grows. The seal between the battery and terminal has been maintained in the course of relative movement by use of variety of bushings, O-rings, or gaskets between the case and the terminal structures. However such sealing components can deteriorate and fail over time or with excessive pressure deformation.

Therefore, a unitary expandable case sealed to the battery terminal seal is provided for relieving internal grid growth pressure on the seal at the terminal and maintaining battery/terminal seal integrity.

SUMMARY OF THE INVENTION

This invention provides an expandable region of the thermoplastic case surrounding a battery terminal for relieving pressure on that terminal due to grid expansion while simultaneously maintaining of the integrity of the case seal to the terminal. The expandable seal includes a case cover having an opening therethrough for passage of a terminal bushing for supporting battery plates of one polarity. A tubular thermoplastic sleeve formed integrally with the case cover extends into the opening between the cover and the bushing. Airtight flexible thermoplastic connector means connects the sleeve to the case or the bushing. The flexible connector means is an annular flexible thermoplastic connector integral with the sleeve, extending entirely around the sleeve and sufficiently thinner than the case cover to afford more flexibility than the case cover.

The expandable battery terminal and case section minimizes, if not eliminates, risk of fracture as the positive battery grids expand and the case changes shape somewhat due to pressure built up or reduced due to partial vacuum within the battery.

BRIEF DESCRIPTION OF THE DRAWINGS

The foregoing summary, and the following detailed description, will be best understood when read in conjunction with the attached figures, in which:

FIGS. 4A and 4B show in cross section, a further embodiment of a positive terminal and different connection in two different positions of the terminal and case cover.

DETAILED DESCRIPTION OF THE PREFERRED EMBODIMENTS

This invention provides an expandable flexible connection between a battery cell case cover and terminal to compensate for expansions of plates or grids of one polarity connected to that terminal. The expandable design encompasses a flexible battery case which facilitates movement of the battery terminal. Specifically, as much as 0.75 inch of movement of the terminal relative to the thermoplastic cell case cover can be accommodated. The purpose is to allow movement of a battery terminal without compromising the seal between the case and the terminal.

Figure 1:
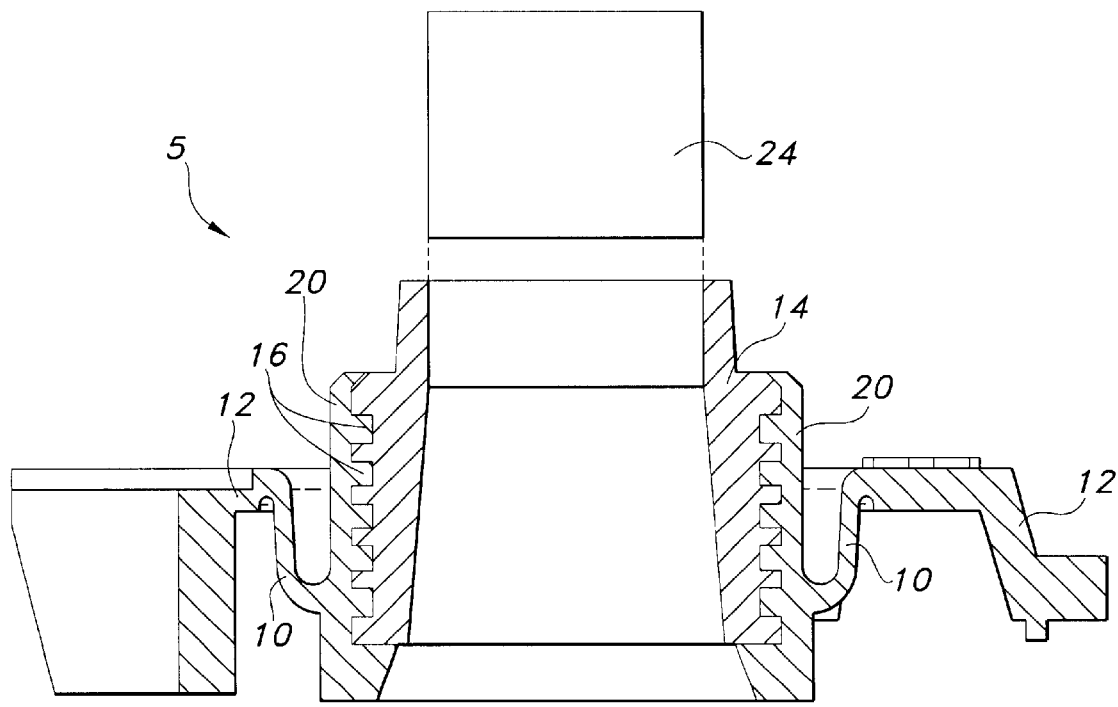
FIG. 1 is a sectional view along the axis of the expandable battery terminal and showing in section a case cover assembly manifesting aspects of the invention.

Referring now to FIG. 1, part of a lead acid battery, generally designated 5, having an expandable battery case cover 12 and a lead alloy bushing 14 for receiving a battery terminal, is shown. The case and case cover 12 are made of a moldable thermoplastic resin, such as polypropylene, and ultimately sealed together after assembly. The case cover 12 includes an integrally molded tubular sleeve 20 which extends transversely to the case cover into an opening for receiving the terminal post. The lead alloy bushing 14, which is ultimately connected mechanically and electronically and sealed airtight to a terminal post extension, has successive annular grooves in its outer generally cylindrical surface to facilitate bonding to sleeve 20 as the sleeve is formed in place around the bushing in the molding process. The bushing of this embodiment is incorporated into the mold when the case cover, including sleeve 20, is cast. The grooves 16 on the outer cylindrical surface of its terminal post extension lead bushing 14 receive molten polypropylene or other thermoplastic material in the mold so taht a good permanent air tight bond is acheived with molded tubular sleeve 20. Bushing 14 may be heated or chemically treated with a suitable bonding agent for improving the seal between bushing 14 and sleeve 20. A terminal post for plates of common polarity is welded into the bushing, as is a copper insert 24 to improve electrical connection to the terminal.

Resilient case cover wall 12 is molded integrally with a flexible thinner wall connection 10. Connection 10 connects the outside surface of the integrally molded sleeve 20 to the case cover 12. Flexible connection 10 is annular and connected generally normal to the tubular sleeve. It makes an upward turn toward its generally coplanar connection to the cover 12. The connection 10 is sufficiently thinner than the case to provide a flexible loop. The integral flexible loop typically molded to have a thickness sufficiently less than that of the case wall to afford the flexibility needed to bend into a loop as it moves upwardly relative to the case cover 12 while maintaining the seal between the bushing 14 and the tubular sleeve 20.

Referring now to the diagrammatic FIGS. 2A, 2B, 2C and 2D, the terminal bushing, case cover and their connection 10 of FIG. 1 are shown in successively changing positions as cell grid expansion progresses. As can be appreciated, the end of the flexible connector 10 attached to the case sleeve deforms outwardly relative to the battery in response to cell grid expansion pressures. The flexible connector 10 changes shape. As shown, the flexibility of the connector 10 permits the case sleeve 20 to move away from the case cover 12 without destroying the continuity provided by the flexible connector loop.

Figure 3:
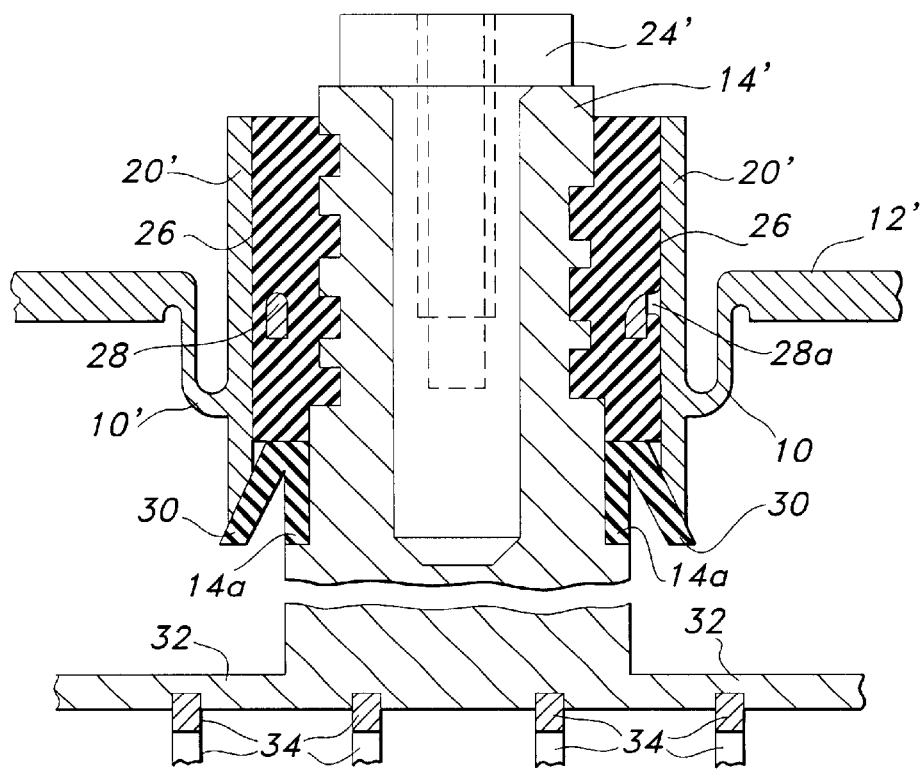
FIG. 3 is a partial sectional view through the axis of the terminal of an alternative embodiment of the expandable battery terminal and case section of FIG. 1.
Figure 2A:
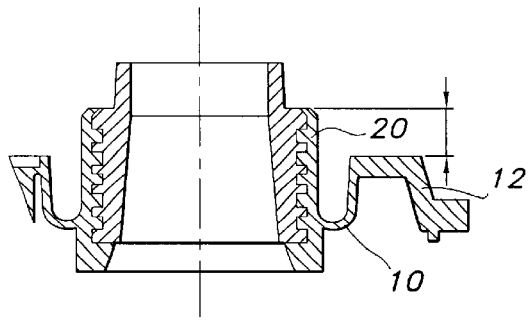
FIGS. 2A, 2B, 2C and 2D are a series of smaller sectional diagrammatic views similar to FIG. 1 illustrating various stages of movement of a positive terminal and deformation of the expandable battery case cover in accordance with the invention.
Figure 2B:
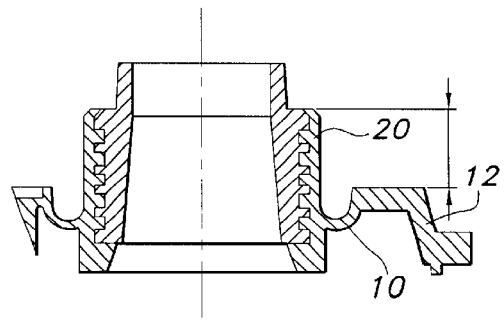
Figure 2C:
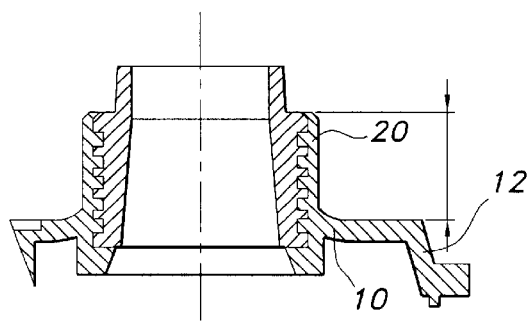
Figure 2D:
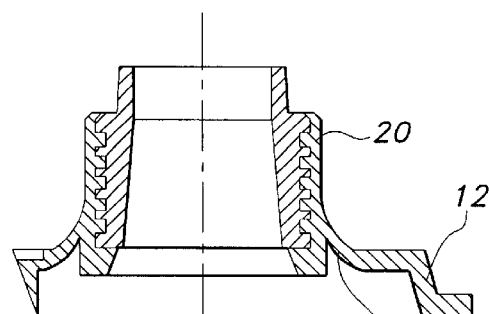

In an alternative embodiment shown in FIG. 3, a uniform thickness tubular sleeve 20' is integrally molded with the case cover 12' with the flexible connector 10' interconnecting them in generally the same configuration as FIG. 1. Thus corresponding parts are indicated with the same number designator with the addition of a prime thereto. The lead-alloy terminal post extension 14' is not molded integrally with the case cover of this embodiment but is shown with a copper terminal insert 24' welded axially in place, which insert is provided with a threaded axial bone. An epoxy compound 26 is utilized to seal the post extension 14' to tubular sleeve 20' attached to the case cover 12' by integrally molded flexible connection 10'. An annular inverted V-section resilient gasket 30 rests on a shoulder 14A of the lead-alloy post extension 14' and resiliently bears against the sleeve 20' closing off the bottom of the space between. Consequently, a liquid epoxy poured between the bushing 14' and sleeve 20' is retained and will harden into an airtight seal. An annular lock ring 28 molded integrally with the inside of tubular sleeve 20' and connected thereto by periodically spaced posts 28a is embedded within the epoxy 26 to better secure the sleeve 20' to the post extension 14'. Since the post extension is not molded with the case cover in this case, as with bushing 14 in FIG. 1, post extension assembled to the plates before pouring the epoxy. The post extension 14' which extends well into the battery case below the case cover 12' as shown broken in FIG. 3 to foreshorten its length. The post extension is shown assembled with the connector 32 for the plates and the positive plates 34 themselves (the top of which are here schematically represented) assembled. When the epoxy is poured, therefore, not only the post extension but its entire assembly is connected thereby to the case cover 12'. Negative plates and then the intervening insulators between positive and negative plates may also be assembled and connected to the case cover by pouring liquid epoxy. This would be done when the whole assembly is in place, probably supported by fixtures then, the whole assembly supported on the case cover 12' can be placed together in the case (jar) with electrolytes and the case and cover sealed together.

Still another alternative embodiment of the invention is seen in FIGS. 4A and 4B, again much of the basic structure is similar and some parts similar to those in other embodiments are given the same number designator with the addition of double primes, as case cover 12" and bushing 14". The connector is designated 10", although it assumes a different form in this embodiment, in that it is effectively an extension of the tubular shell 20" thinned down to be very flexible and in this case to loop inwardly from the shell 20", instead of outwardly. In this case, the bushing is molded with a thermoplastic ring 36, which, like the tubular sleeve 10 of the FIG. 1 embodiment, is able to fill the annular grooves around the bushing to ensure a better bonding and airtight connection. The outer surface of the ring 36 is a right circular cylinder which is dimensioned to snugly fit within tubular shell 20" and provided with a shoulder 36a which rests atop the tubular sleeve as a means for indexing the structures when they are assembled. The free end of the connector 10" is turned inwardly to provide a generally planar circumferential sealing surface which is in turn sealed to the flat bottom 38 of ring 36 by sonic sealing, for example to ensure an airtight seal between the structures. Hence, an overall airtight battery structure exists after the conductive inser 24" is then put in a snugly fitting position within the busing and welded thereto. Insert 24", in this case is part of connector post 40 providing a common connector for the plates which are connected together and to the terminal post.

As expansion occurs, in this case the plates and the connector 40 drive the bushing 14" and the ring 36 upwardly. Relative movement occurs between the tubular sleeve 20" and the ring 36 and the circumferential connector because of its flexibility is able to move upwardly with the ring to which it is attached so that the connector assumes the loop form as seen in FIG. 4B. Movement can occur up to 0.75 inch without rupture of the seal. Thus, it will be seen that in each case a thinner more flexible connector is provided circumferentially between relatively moving parts. As relative movement occurs the connector 10" changes shape to accommodate the movement from maintaining the seal.

Although the connector assumes different positions than the various embodiments and may assume even different positions from those shown. As long as such an extra thin flexible resinous connector is provided between moveable parts, the seal can be maintained through the limited range of movement normally experienced, particularly at the positive terminal of lead-acid battery.

Other forms and embodiments of the invention within the scope of the claims will occur to one skilled in the art and are intended to be within the scope and spirit of the present invention.

It will be apparent to those skilled in the art that there may be a multiple cells or multiple terminals and single cell and a lead-acid battery for each polarity, the invention may be applied to as many terminals as used in the battery or may be applied to those terminals of one polarity, particularly the positive polarity, which tends to experience greater movement in the life of the battery.

The following is claimed:

1. A lead-acid battery having a thermoplastic case cover with at least one terminal sealed to the case cover in a manner which permits movement relative to the case cover comprising:

a. a lead terminal part for supporting battery plates of one polarity;

b. a case cover having an opening therethrough to receive the terminal bushing;

c. a thermoplastic tubular sleeve formed integral with said case cover extending into the aperture for connecting to said terminal bushing; and d. airtight means of reduced thickness relative to a surrounding proximate portion of said cover, said reduced thickness portion extending axially along said terminal part inwardly of said cover a distance exceeding sleeve thickness at the outset of battery life and being annularly spaced from said sleeve a distance exceeding sleeve thickness, said means being adapted to flex in response to battery plate growth to a position at which said reduced thickness portion extends outwardly of said cover, connecting the sleeve to the terminal bushing and further airtight thermoplastic means connecting the sleeve to the case cover.

2. The battery of claim 1, in which one of said means including an annular flexible connector, the flexible connector connects the tubular sleeve about the outer periphery thereof to the case cover at a higher level than the sleeve connection away from the case interior.

3. The battery of claim 2, in which the connector initially extends outward from the tubular sleeve connection and assumes the form of a loop as the terminal part moves outward.

4. The battery of claim 3, wherein the thermoplastic case cover at its said exterior wall is planar and the connector initially extends inwardly from the case cover.

5. The battery of claim 4, wherein the tubular sleeve is cylindrical.

6. The battery of claim 4, further having the lead terminal bushing, as a lead terminal part, sealed in place as part of the battery cover connector with the sleeve molded around the bushing so that the inner surface assumes the shape of the bushing portion to which it bonds.

7. The battery of claim 4, wherein said sleeve is cylindrical, bonded to and conforming to the shape of the outer wall of the lead bushing.

8. The battery of claim 1, in which the flexible connector connects the tubular sleeve to a ring sealed airtight around the terminal part and provided with a surface relative to which the tubular sleeve can slide.

9. The battery of claim 8, in which the ring is thermoplastic material of a type compatible with the connector material for permitting thermal sealing between the two and the seal to the ring is made interior of the battery case from the relatively sliding surfaces.

10. The battery of claim 9, in which the connector is a thinner extension of the interior edge of the tubular sleeve inside the battery extending inward to the compatible ring around the terminal part to which the connector is sealed.

11. The battery of claim 10, in which the end of the connector is sealed to a planar surface of the thermoplastic ring around the terminal part.

12. A lead-acid battery having positive and negative plates within a thermoplastic case, insulating separators and an electrolyte which contacts the plates, the plates being supported on terminals penetrating and sealed to the case cover to which at least one terminal is sealed such that movement relative to the case cover can occur and, which in turn is sealed to the case, said at least one terminal seal comprising:

a. a thermoplastic tubular sleeve integral with the case cover extending into an aperture in the case cover for receiving the terminal; and b. airtight means of reduced thickness relative to a surrounding proximate portion of said cover, said reduced thickness portion extending axially along said terminal part inwardly of said cover a distance exceeding sleeve thickness at the outset of battery life and being annularly spaced from said sleeve a distance exceeding sleeve thickness, said means being adapted to flex in response to battery plate growth to a position at which said reduced thickness portion extends outwardly of said cover, connecting the sleeve to the terminal and further airtight thermoplastic means connecting the sleeve to the case cover.

13. The lead-acid battery thermoplastic case of claim 12, further comprising a lead bushing about which the sleeve is molded for receiving a positive terminal of said battery within said sleeve.

14. A lead-acid battery thermoplastic case comprising:

a. an exterior wall having an aperture therethrough for passage of a positive terminal;

b. a sleeve within said aperture, formed integrally with said case and said exterior wall for receiving said positive terminal; and, c. a flexible loop of reduced thickness relative to a surrounding proximate portion of said exterior wall and extending inwardly of said exterior wall a distance exceeding sleeve thickness at the outset of battery life, being annularly spaced from said sleeve a distance exceeding sleeve thickness, being adapted to flex in response to battery plate growth to a position at which said loop extends outwardly of said exterior wall, said loop connecting said wall with said sleeve about the respective peripheries thereof, said loop being integral with said sleeve continuously about the periphery thereof and connecting said bottom portion to said exterior wall continuously about the periphery of said aperture and sufficiently flexible to deform into a loop upon axial movement of a terminal resident within said sleeve.

15. A lead-acid battery comprising:

a. a molded case of thermoplastic material having an aperture through an exterior wall for passage of a positive terminal;

b. a tubular sleeve within said aperture, formed integrally with said exterior wall for receiving said positive terminal;

c. an integral flexible connector of said thermoplastic material thinner and more flexible than said exterior wall and being of reduced thickness relative to a surrounding proximate portion of said exterior wall, extending axially inwardly of said exterior wall a distance exceeding sleeve thickness at the outset of battery life and being annularly spaced from said sleeve a distance exceeding sleeve thickness, to flex in response to battery plate growth to a position extending outwardly of said exterior wall, connecting said wall with said sleeve about the respective peripheries thereof; and d. a lead bushing fixedly retained and sealed within said sleeve, for receiving a positive terminal of said battery there within.

16. A lead-acid battery comprising:

a. an exterior wall having an aperture therethrough for passage of a positive terminal;

b. a cylindrical sleeve within said aperture, formed integrally with said exterior wall for receiving said positive terminal;

c. a flexible connector connecting and integral with said wall and said cylindrical sleeve about the respective peripheries thereof of reduced thickness relative to a surrounding proximate portion of said exterior wall, extending axially inwardly of said exterior wall a distance exceeding sleeve thickness at the outset of battery life and being annularly spaced from said sleeve a distance exceeding sleeve thickness, said means being adapted to flex in response to battery plate growth to a position at which said reduced thickness portion extends outwardly of said exterior wall, said connector permitting movement of the positive terminal outwardly from the battery.

\* \* \* \* \*

UNITED STATES PATENT AND TRADEMARK OFFICE
CERTIFICATE OF CORRECTION

PATENT NO.    : 6,312,852 B1
DATED         : November 6, 2001
INVENTOR(S)   : Wagner Page 1 of 1

It is certified that error appears in the above-identified patent and that said Letters Patent is hereby corrected as shown below:

Title page,
ABSTRACT, line 6, the printed patent incorrectly reads "without compromising the scal". The patent should read -- without compromising the seal... --.

Column 2,
Line 58, the printed patent incorrectly reads "material in the mold so that a". The patent should read -- material in the mold so that a --.

Column 3,
Line 5, the printed patent incorrectly reads "The connection 10 is sufficiently thinner". The patent should read -- The connector 10 is sufficiently --.

Column 4,
Line 15, the printed patent incorrectly reads "inser 24" is then put". The patent should read -- insert 24" is then put --.

Column 6,
Line 6, the printed patent incorrectly reads "positive terminal; and,". The patent should read -- positive terminal; and --.

Signed and Sealed this

Twenty-eighth Day of May, 2002

Attest:

*Attesting Officer*

JAMES E. ROGAN
*Director of the United States Patent and Trademark Office*